(12) United States Patent
Brown

(10) Patent No.: US 7,175,142 B2
(45) Date of Patent: Feb. 13, 2007

(54) TRANSMISSION OIL COOLER BRACKET

(75) Inventor: Daniel J. Brown, Northville, MI (US)

(73) Assignees: Custom Molders, Inc., Durham, NC (US); Labelle-Suomela, Inc., Redford Township ( * ) Notice: Subject to any disclaimer, the term of this patent is extended or adjusted under 35 U.S.C. 154(b) by 142 days.

(21) Appl. No.: 10/970,140

(22) Filed: Oct. 21, 2004

(65) Prior Publication Data

US 2006/0086875 A1    Apr. 27, 2006

(51) Int. Cl.
| | |
|---|---|
| A47B 96/06 | (2006.01) |
| A47K 1/00 | (2006.01) |
| A47K 5/00 | (2006.01) |
| E04G 3/00 | (2006.01) |
| E04G 5/06 | (2006.01) |
| F21V 21/00 | (2006.01) |

(52) U.S. Cl. .................. 248/213.3; 248/200; 248/201; 248/205.1; 248/232

(58) Field of Classification Search ................ 248/200, 248/201, 205, 213.3, 235, 232, 247, 250
See application file for complete search history.

(56) References Cited

U.S. PATENT DOCUMENTS

| | | | | |
|---|---|---|---|---|
| 3,471,112 A | * | 10/1969 | MacDonald et al. ........ | 248/239 |
| 4,037,813 A | * | 7/1977 | Loui et al. .................. | 248/250 |
| 4,053,132 A | * | 10/1977 | Del Pozzo .................. | 248/235 |
| 4,432,523 A | * | 2/1984 | Follows ....................... | 248/250 |
| D289,494 S | * | 4/1987 | Rice ............................ | D8/381 |
| 4,666,117 A | * | 5/1987 | Taft ............................ | 248/243 |
| 4,732,358 A | * | 3/1988 | Hughes et al. .............. | 248/243 |
| 4,735,391 A | * | 4/1988 | Lawrence ................... | 248/243 |
| D299,809 S | * | 2/1989 | Hagedorn .................... | D8/373 |
| 4,819,901 A | * | 4/1989 | McDonald .................. | 248/250 |
| 4,856,746 A | * | 8/1989 | Wrobel et al. .............. | 248/250 |
| 4,909,465 A | * | 3/1990 | Lyman ....................... | 248/250 |
| D312,382 S | * | 11/1990 | Ryll ............................ | D8/349 |
| 5,069,483 A |   | 12/1991 | Hirasawa |   |
| 5,080,311 A | * | 1/1992 | Engstrom ................... | 248/250 |
| D325,564 S | * | 4/1992 | Lemke ........................ | D13/154 |
| 5,139,080 A |   | 8/1992 | Bolton et al. |   |
| 5,195,708 A | * | 3/1993 | Marsh ........................ | 248/250 |
| D336,482 S | * | 6/1993 | Graham ...................... | D15/141 |
| 5,219,016 A |   | 6/1993 | Bolton et al. |   |
| 5,406,894 A | * | 4/1995 | Herrmann et al. .......... | 108/108 |
| D363,927 S | * | 11/1995 | Rosen ........................ | D14/451 |
| 5,487,422 A |   | 1/1996 | Bertva et al. |   |
| 5,566,748 A |   | 10/1996 | Christensen |   |
| 5,570,738 A |   | 11/1996 | Christensen |   |
| 5,577,695 A | * | 11/1996 | Ruckwardt .................. | 248/200 |
| 5,657,817 A |   | 8/1997 | Heine et al. |   |
| 5,785,115 A |   | 7/1998 | Laveran |   |

(Continued)

Primary Examiner—Anita King
Assistant Examiner—Michael McDuffie
(74) Attorney, Agent, or Firm—Carlson, Gaskey & Olds

(57) ABSTRACT

A heat exchanger mounting bracket includes a frame mount bracket portion and a heat exchanger bracket portion. The heat exchanger bracket portion is mounted to the vehicle frame member by threading a fastener through a mounting aperture. A lower heat exchanger bracket slip fits into a slot in the heat exchanger bracket portion such that the heat exchanger is supported upon the shelf. An upper heat exchanger bracket includes an aperture which receives a post which extends from the heat exchanger bracket portion such that the heat exchanger is locked thereto.

18 Claims, 11 Drawing Sheets

U.S. PATENT DOCUMENTS

| | | | |
|---|---|---|---|
| D408,266 S * | 4/1999 | Santiago | D8/354 |
| 6,050,833 A * | 4/2000 | Danzyger et al. | 439/92 |
| 6,105,794 A * | 8/2000 | Bauer | 211/94.01 |
| 6,158,500 A | 12/2000 | Heine | |
| 6,186,456 B1 * | 2/2001 | Marsh | 248/243 |
| 6,199,622 B1 | 3/2001 | Mashio et al. | |
| 6,202,737 B1 | 3/2001 | Mahe | |
| 6,273,182 B1 | 8/2001 | Pautler et al. | |
| 6,305,465 B1 | 10/2001 | Uchikawa et al. | |
| 6,318,450 B1 | 11/2001 | Acre | |
| 6,471,133 B1 | 10/2002 | O'Flynn et al. | |
| 6,527,044 B2 | 3/2003 | Mangold | |
| 6,547,478 B1 * | 4/2003 | Lin | 403/339 |
| 6,622,438 B2 * | 9/2003 | Hurlock | 52/127.2 |
| 6,691,767 B2 | 2/2004 | Southwick et al. | |

* cited by examiner

TRANSMISSION OIL COOLER BRACKET

BACKGROUND OF THE INVENTION

The present invention relates to a support structure for a vehicle transmission oil cooler, and more particularly to a heat exchanger bracket.

Current transmission oil coolers utilize an air-to-liquid type heat exchanger. In this type of heat exchanger, air flowing through the grill of the vehicle also flows through the oil cooler and oil from the transmission passes through tubes in the heat exchanger. This type of cooler may be difficult to install such that the heat exchanger is provided with the interception of relatively low temperature air.

Various mounting arrangements for vehicle heat exchangers such as transmission oil coolers are known. Typically, a plurality of metal brackets are welded to a vehicle frame and the heat exchanger is attached thereto by threaded fasteners. Disadvantageously, welding requires an increased number of working steps during vehicle assembly.

Further, conventional mounting arrangements typically require a multiple of threaded fasteners to assure a secure mount. In many instances, the threaded fasteners may work lose which may result in vibration and/or the fasteners over tightening which may result in damage to the heat exchanger.

Accordingly, it is desirable to provide a support structure for a vehicle heat exchanger which achieves a secure non-metallic mounting arrangement

SUMMARY OF THE INVENTION

The heat exchanger mounting bracket according to the present invention includes a frame mount bracket portion and a heat exchanger bracket portion. A shelf extends from the heat exchanger bracket portion. The shelf includes a slot generally along the face of the heat exchanger bracket portion. A post extends from the heat exchanger bracket portion generally parallel to the frame mount bracket portion.

A heat exchanger is mounted to the vehicle frame member through the heat exchanger bracket portion. The heat exchanger bracket is mounted to the vehicle frame member by threading a fastener through a mounting aperture. A lower heat exchanger bracket slip fits into the slot such that the heat exchanger is supported upon the shelf. An upper heat exchanger bracket includes an aperture which receives the post and is locked thereto.

Another heat exchanger mounting bracket includes a frame mount bracket portion and a heat exchanger bracket portion that define a generally T-shape. The frame mount bracket portion forms a shelf portion generally parallel thereto.

Another heat exchanger mounting bracket includes a frame mount bracket portion and a heat exchanger bracket portion with a hook member which attaches over the heat exchanger.

The present invention therefore provides a support structure for a vehicle heat exchanger which achieves a secure non-metallic mounting arrangement.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
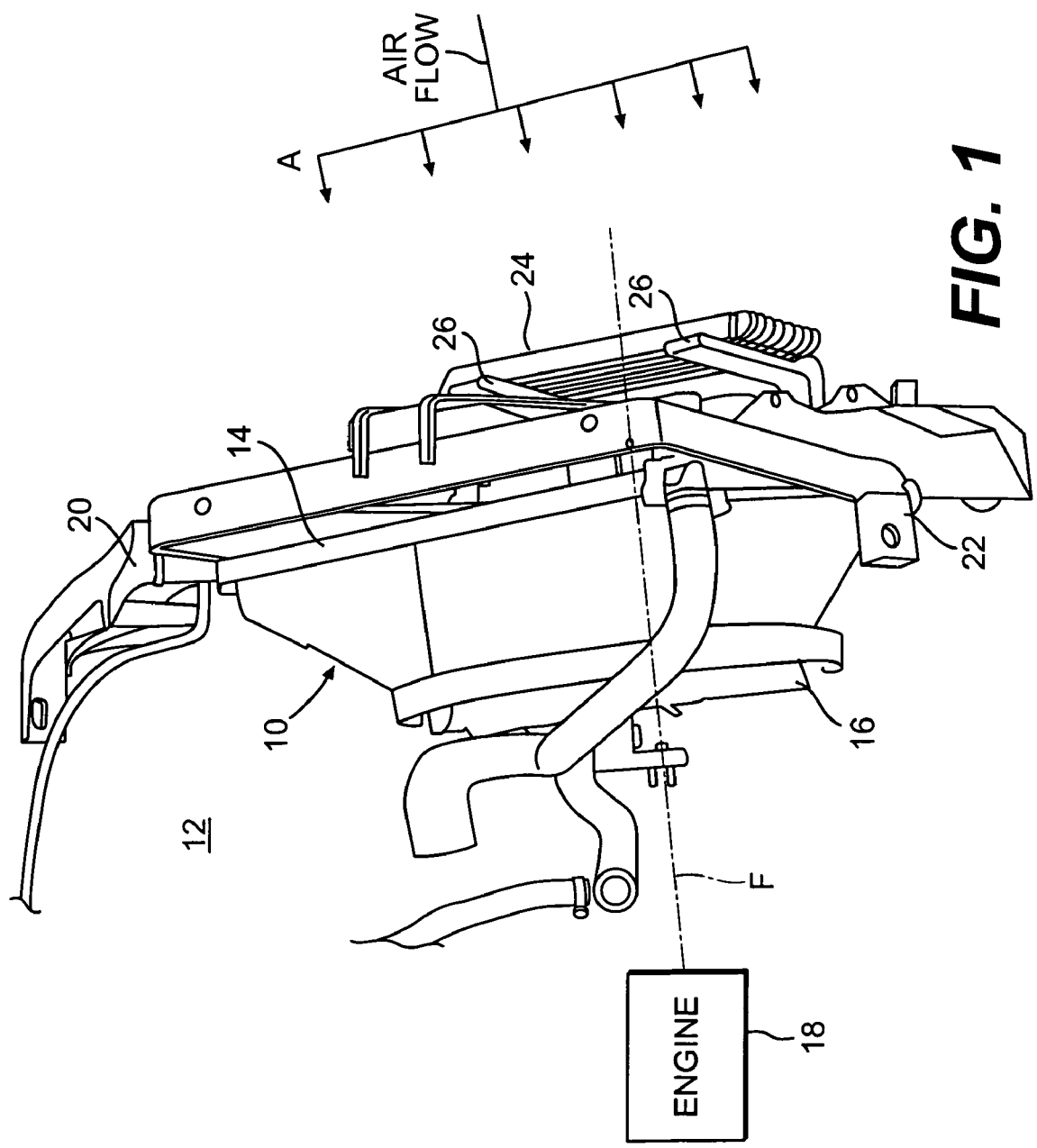
FIG. 1 is a general perspective view of a heat exchanger mounted within a vehicle engine compartment.

FIG. 1 illustrates a general perspective view of a fan shroud 10 mounted within a vehicle engine compartment 12. The fan shroud 10 is positioned adjacent a radiator 14 which is typically mounted forward of, or partially within the fan shroud 10. A cooling fan 16 is mounted between a vehicle engine (illustrated schematically at 18) and the radiator 14. The fan shroud 10 is mounted adjacent a rear face of the radiator 14 in a position to concentrically surround the cooling fan 16. The cooling fan 16 rotates about fan axis F to draw ambient air through the radiator 14 in a direction schematically illustrated by arrows A to flow over engine 18.

The radiator 14 is supported on a vehicle frame member 20. Typically, the radiator is mounted behind the vehicle frame member 20 such that a lower portion of the radiator 14 is mounted upon a lower support 22 rigidly attached to the vehicle frame member 20, however, other support structure arrangements will also benefit from the present invention.

A heat exchanger 24 such as a transmission oil cooler is mounted to the vehicle frame member 20 through a heat exchanger bracket 26 (two shown). Preferably, the heat exchanger is mounted forward of the vehicle frame member 20 to provide maximum exposure to the airflow A, however, other orientations and locations will also benefit from the present invention.

Figure 2:
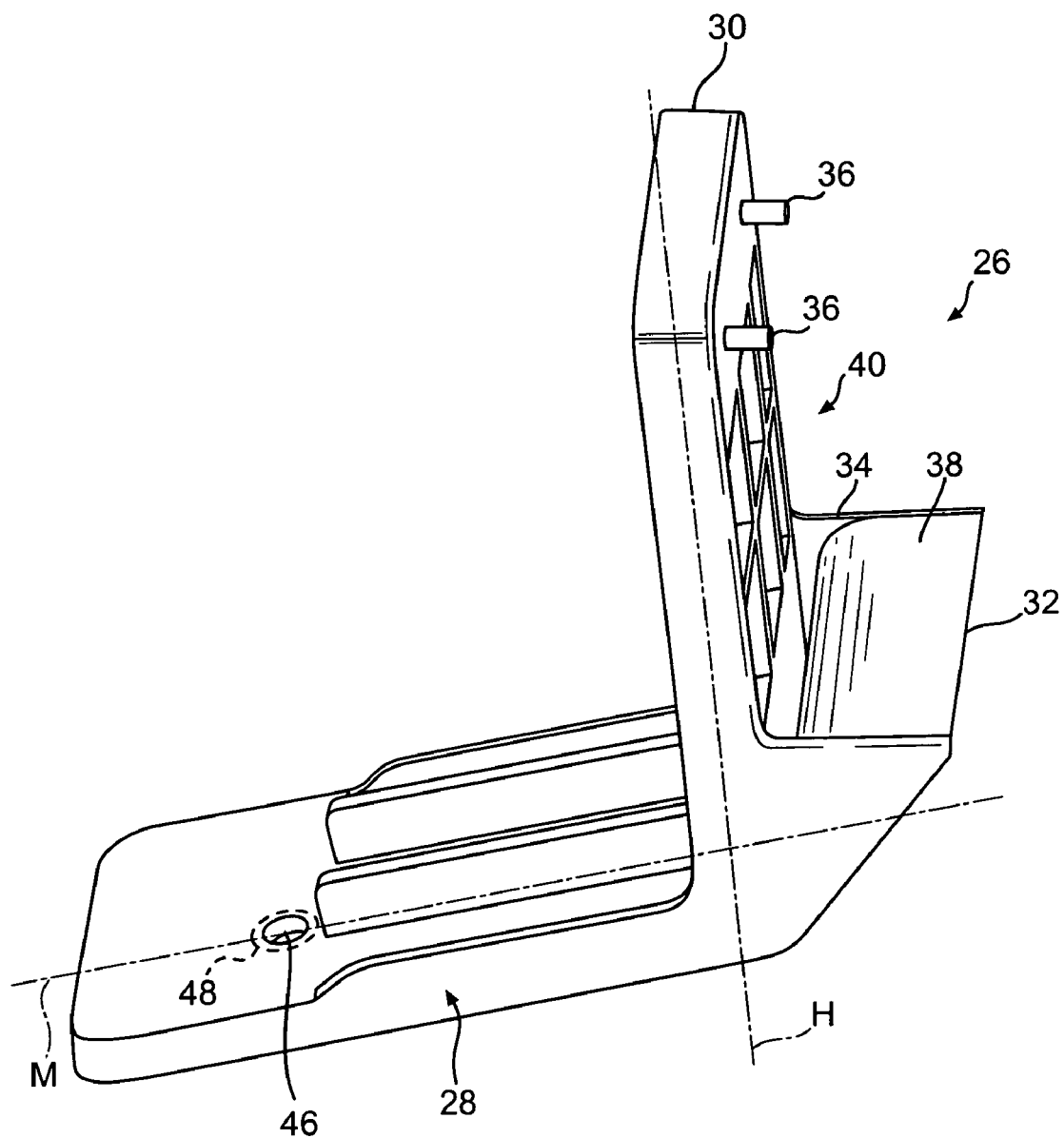
FIG. 2 is an expanded perspective view of a heat exchanger mounting bracket.

Referring to FIG. 2, the heat exchanger bracket 26 is preferably formed of a non-metallic material such as glass-filled polypropylene, Nylon-filled resins, or the like. The heat exchanger bracket 26 is a generally L-shaped member with a frame mount bracket portion 28 which defines an axis H generally perpendicular to a heat exchanger bracket portion 30 which defines an axis M.

Figure 3:
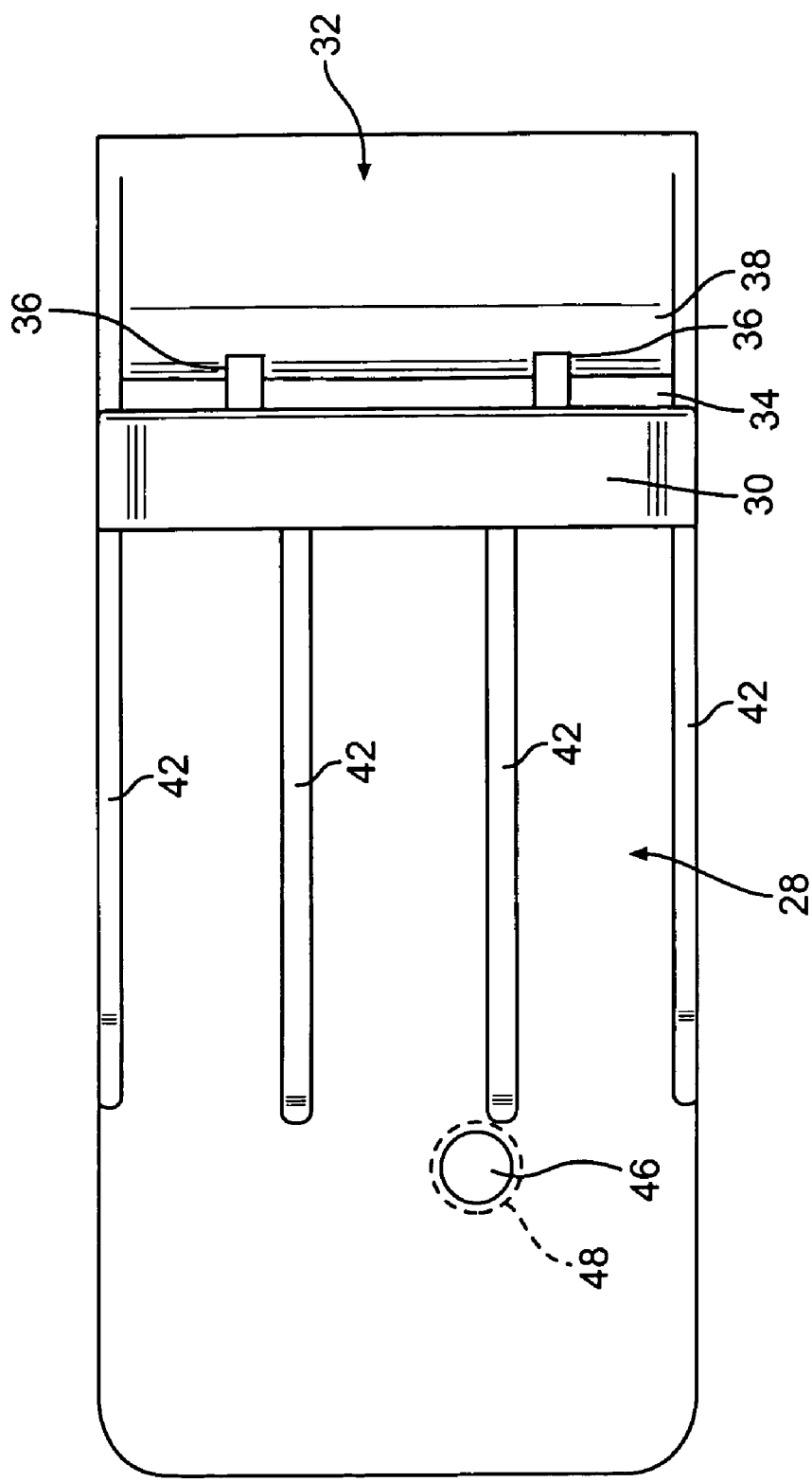
FIG. 3 is an expanded top view of a heat exchanger mounting bracket.

A shelf 32 extends from the heat exchanger bracket portion 30 generally opposite the frame mount bracket portion 28. The shelf 32 is generally parallel to the frame mount bracket portion 28 and an upper attachment 36 such as a cylindrical post. The shelf 32 includes a slot 34 (also illustrated in FIG. 3). The slot 34 is located generally along the face of the heat exchanger bracket portion 30 and includes a radius 38 between the shelf 32 and the slot 34.

Figure 4:
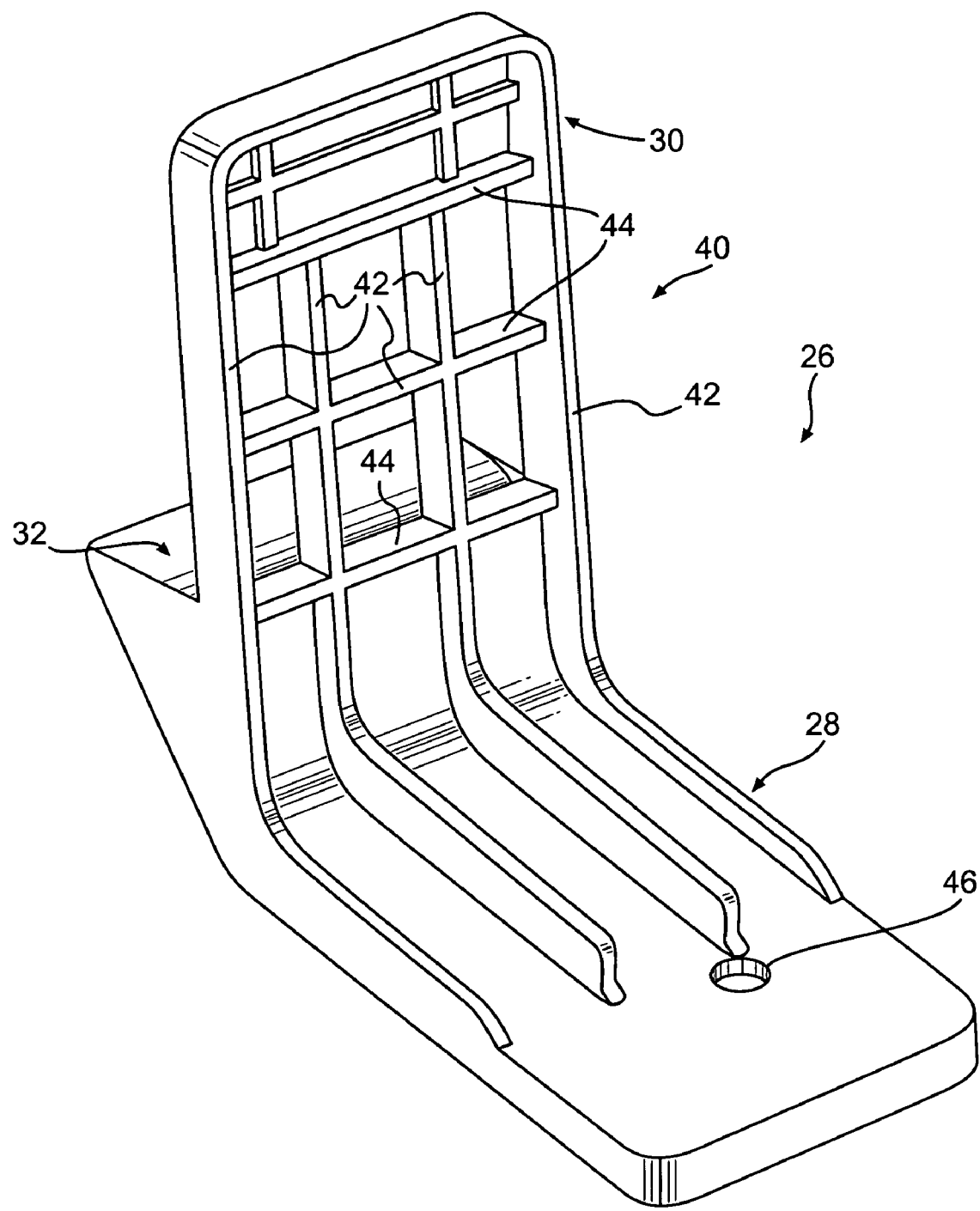
FIG. 4 is an expanded rear view of a heat exchanger mounting bracket.

The upper attachment 36 (two shown) extends from the heat exchanger bracket portion 30 generally parallel to the frame mount bracket portion 28. An open slatted area 40 above the shelf 32 is further defined through the heat exchanger bracket portion 30. The open slatted area 40 is generally defined by a multiple of ribs 42 (four shown) which extend along the heat exchanger bracket portion 30 and into the frame mount bracket portion 28 to provide additional structural rigidity therefore (FIG. 4). Support slats 44 are preferably located transverse the ribs 42.

The frame mount bracket portion 28 includes a mounting aperture 46. The mounting aperture 46 preferably includes a compression limiter 48. The compression limiter 48 is a generally cylindrical metallic sleeve that is either insert or post molded into the frame mount bracket portion 28. The compression limiter 48 may be formed of various materials such as Aluminum, Magnesium, Brass, Bronze, etc.

Figure 5:
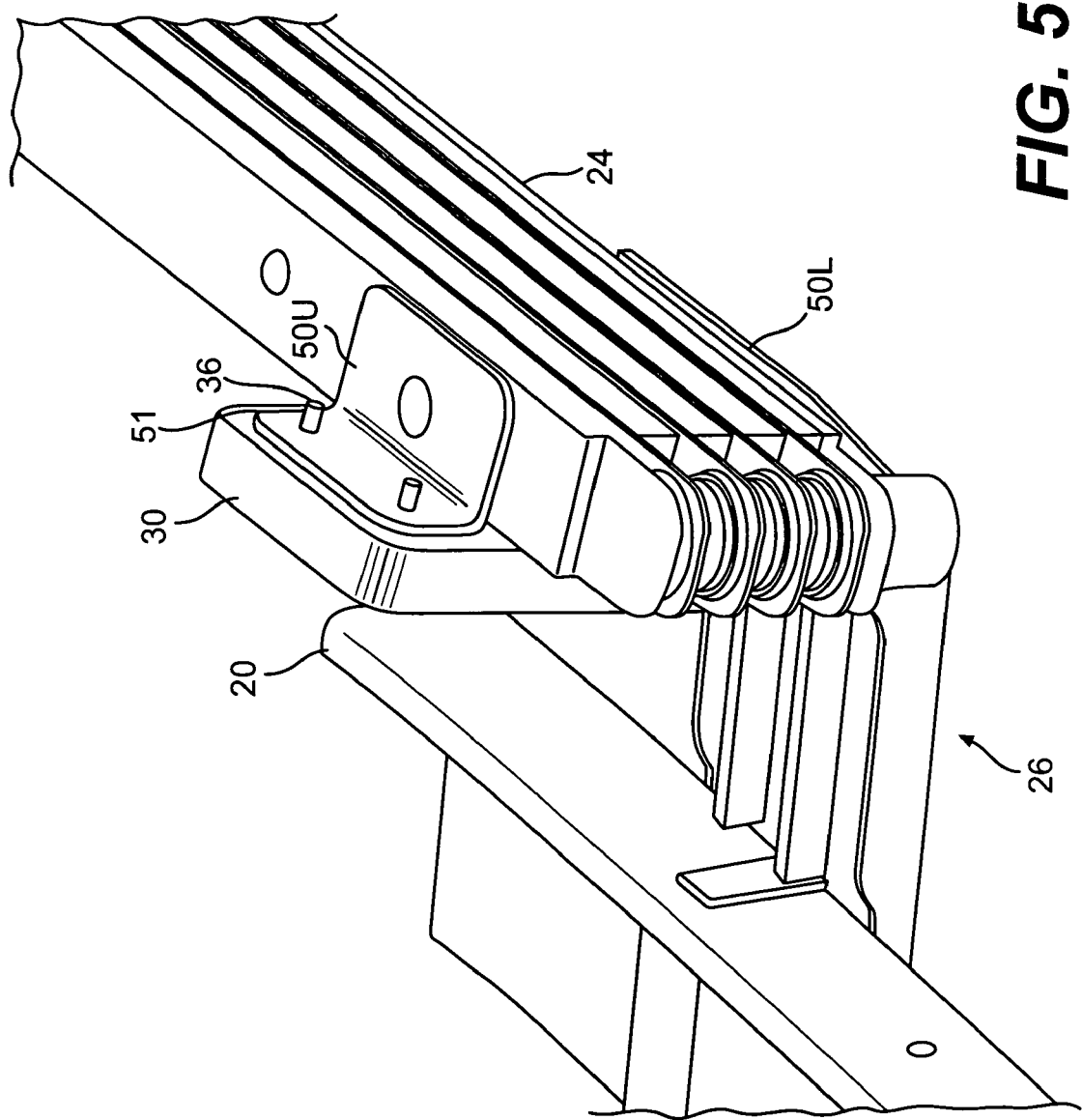
FIG. 5 is a front perspective view of a heat exchanger mounted to a heat exchanger mounting bracket.

Referring to FIG. 5, the heat exchanger 24 is mounted to the vehicle frame member 20 through the heat exchanger bracket 26. The heat exchanger bracket 26 is mounted to the vehicle frame member 20 by threading a fastener 47 through the mounting aperture 46. The compression limiter 48 prevents over tightening and possible crushing of the heat exchanger bracket 26.

Figure 6:
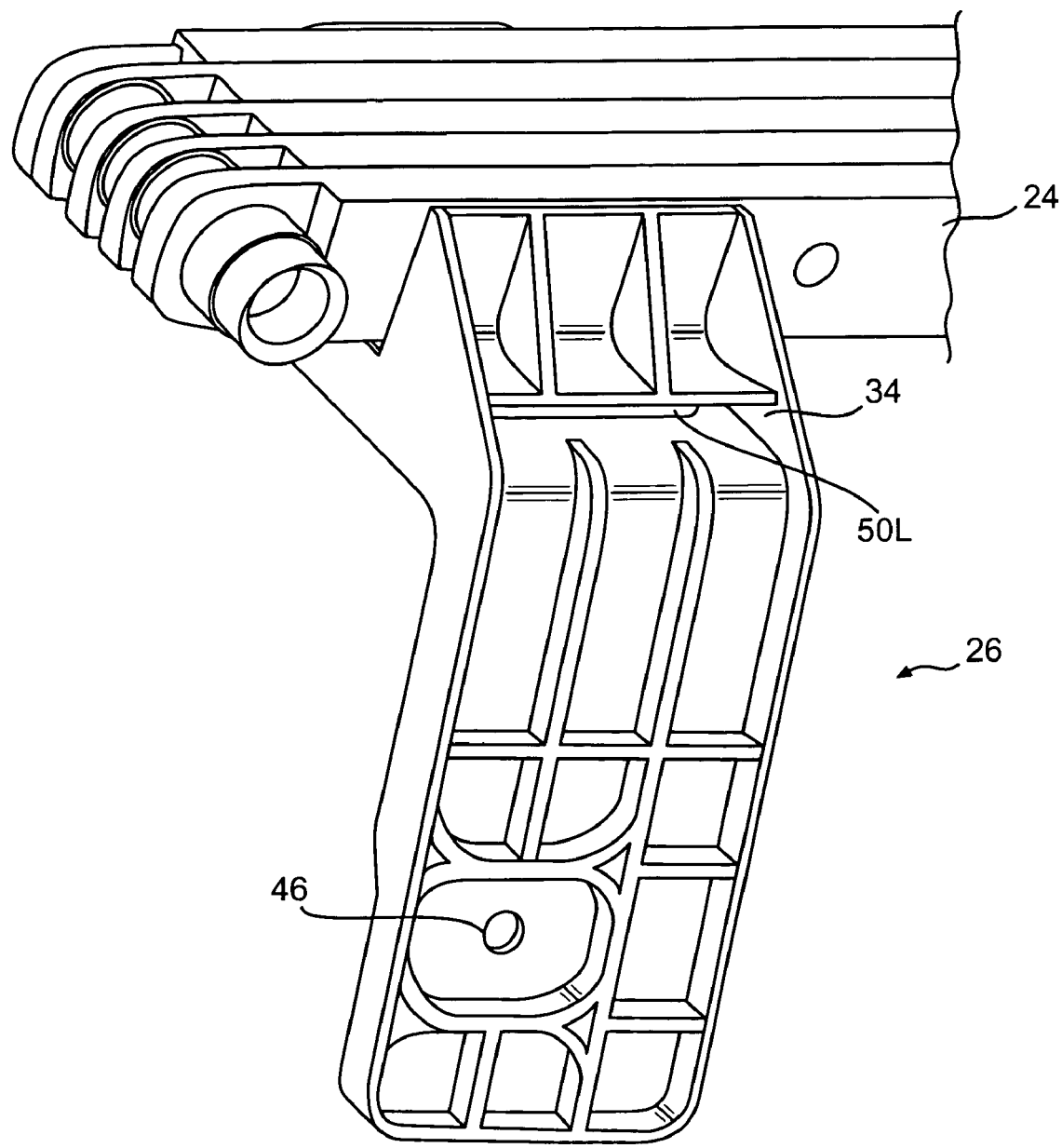
FIG. 6 is a bottom view of a heat exchanger mounted to a heat exchanger mounting bracket.
Figure 7:
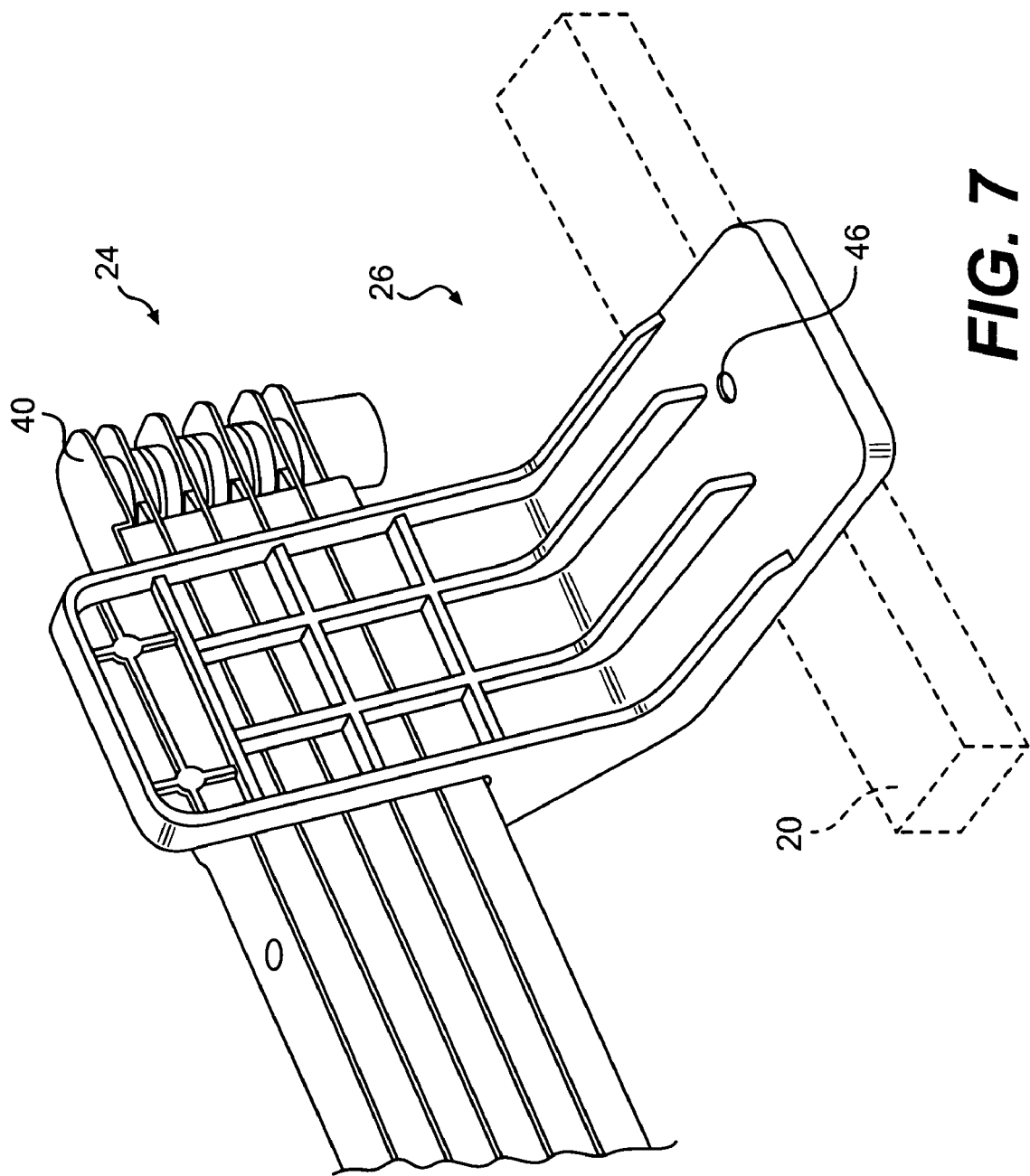
FIG. 7 is a rear perspective view of a heat exchanger mounted to a heat exchanger mounting bracket.

The heat exchanger 24 includes an upper heat exchanger mount 50U and a lower heat exchanger mount 50L which are attached to the heat exchanger through welding or the like. It should be understood that the upper heat exchanger mount 50U and the lower heat exchanger mount 50L may be identical and are preferably manufactured of a metallic material. The lower heat exchanger mount 50L slip fits into the slot 34 (FIG. 6) such that the heat exchanger 24 is supported upon the shelf 32. The upper heat exchanger mount 50U includes an aperture 51 (two shown) which receives the post 36. Once the upper attachment 36 is passed through the aperture 51, each upper attachment 36 is heat/cold staked, riveted or otherwise locked by expanding an end of the post 36 to a diameter greater than the aperture 51. Notably, the open slatted area 40 of the heat exchanger bracket 26 provides for cooling airflow therethrough (FIG. 7).

Figure 8:
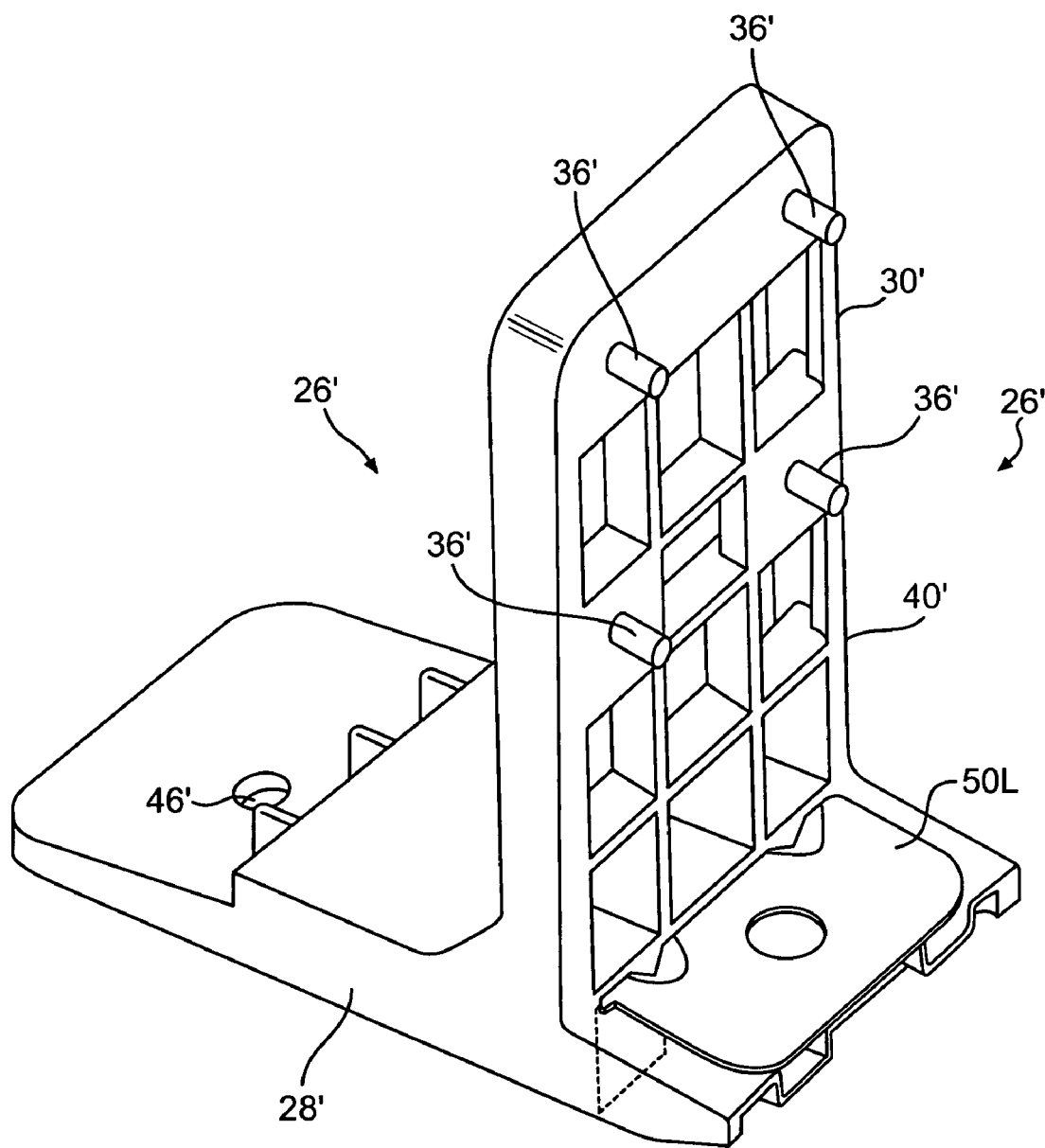
FIG. 8 is an expanded perspective view of yet another radiator mounting bracket designed according to the present invention.
Figure 9:
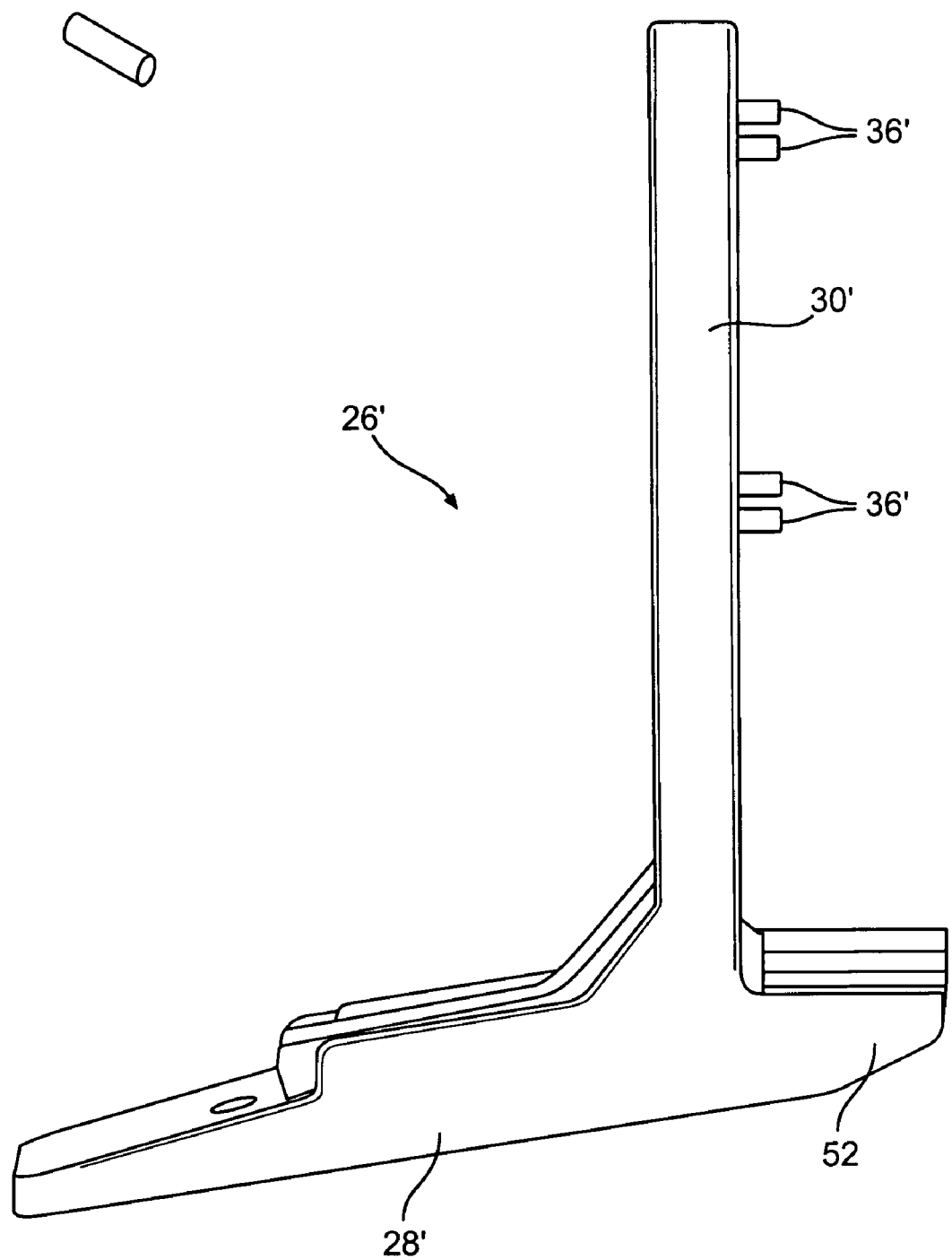
FIG. 9 is an expanded side view of the radiator mounting bracket of FIG. 8.

Referring to FIG. 8, another embodiment of a heat exchanger bracket 26' is disclosed. The mounting bracket assembly 26' generally includes the features of the bracket described above, however, a frame mount bracket portion 28' and a heat exchanger bracket portion 30' define a generally T-shape. That is, the frame mount bracket portion 28' forms a shelf portion 52 generally parallel thereto (FIG. 9). The heat exchanger bracket portion 30' includes a multiple of upper attachments 36' as well as the open slatted area 40'.

Figure 10:
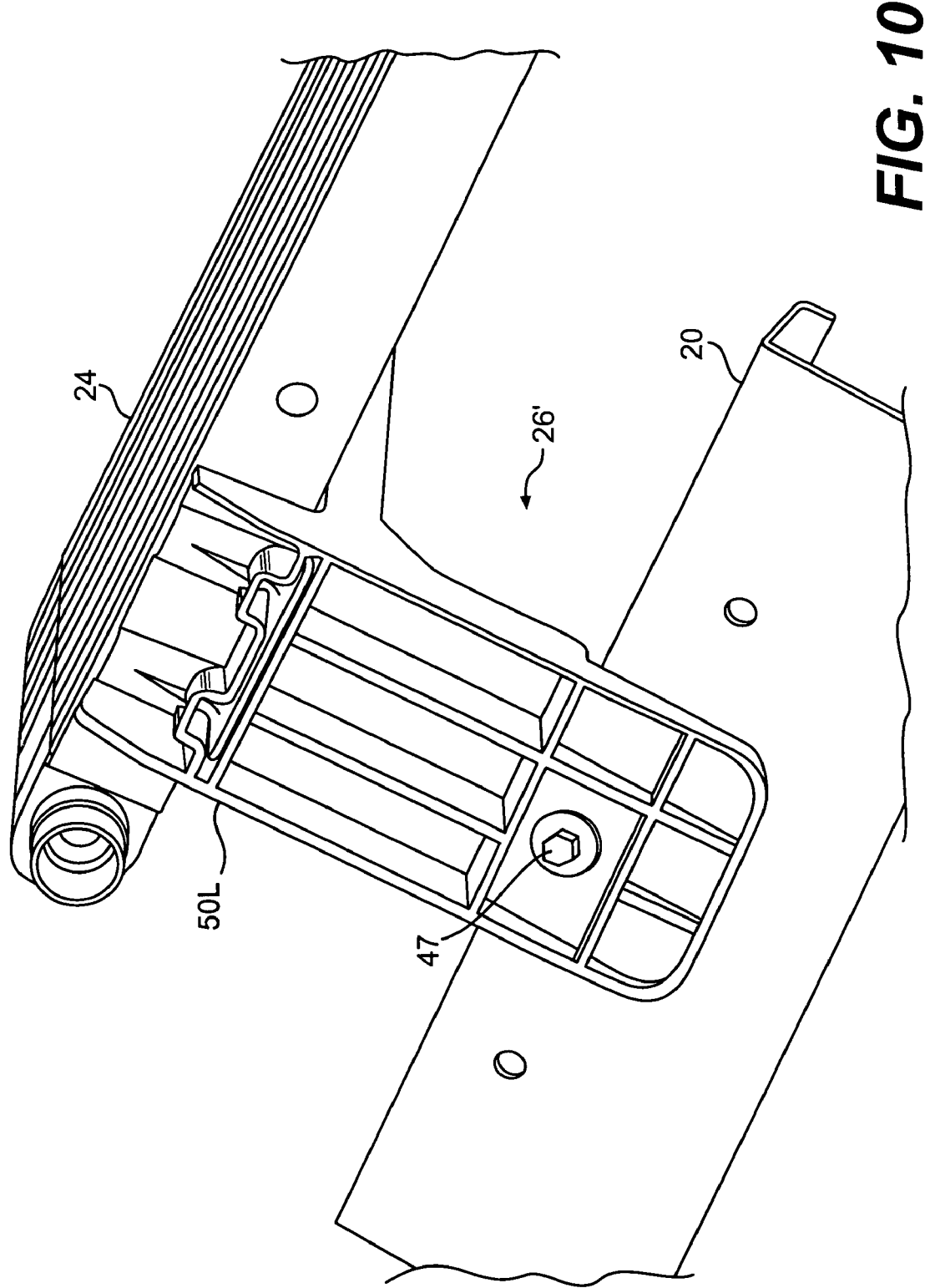
FIG. 10 is an expanded bottom view of a heat exchanger mounted to a heat exchanger mounting bracket of FIG. 8.

Referring to FIG. 10, the heat exchanger 24 is mounted to the vehicle frame member 20 through the heat exchanger bracket 26'.

Figure 11:
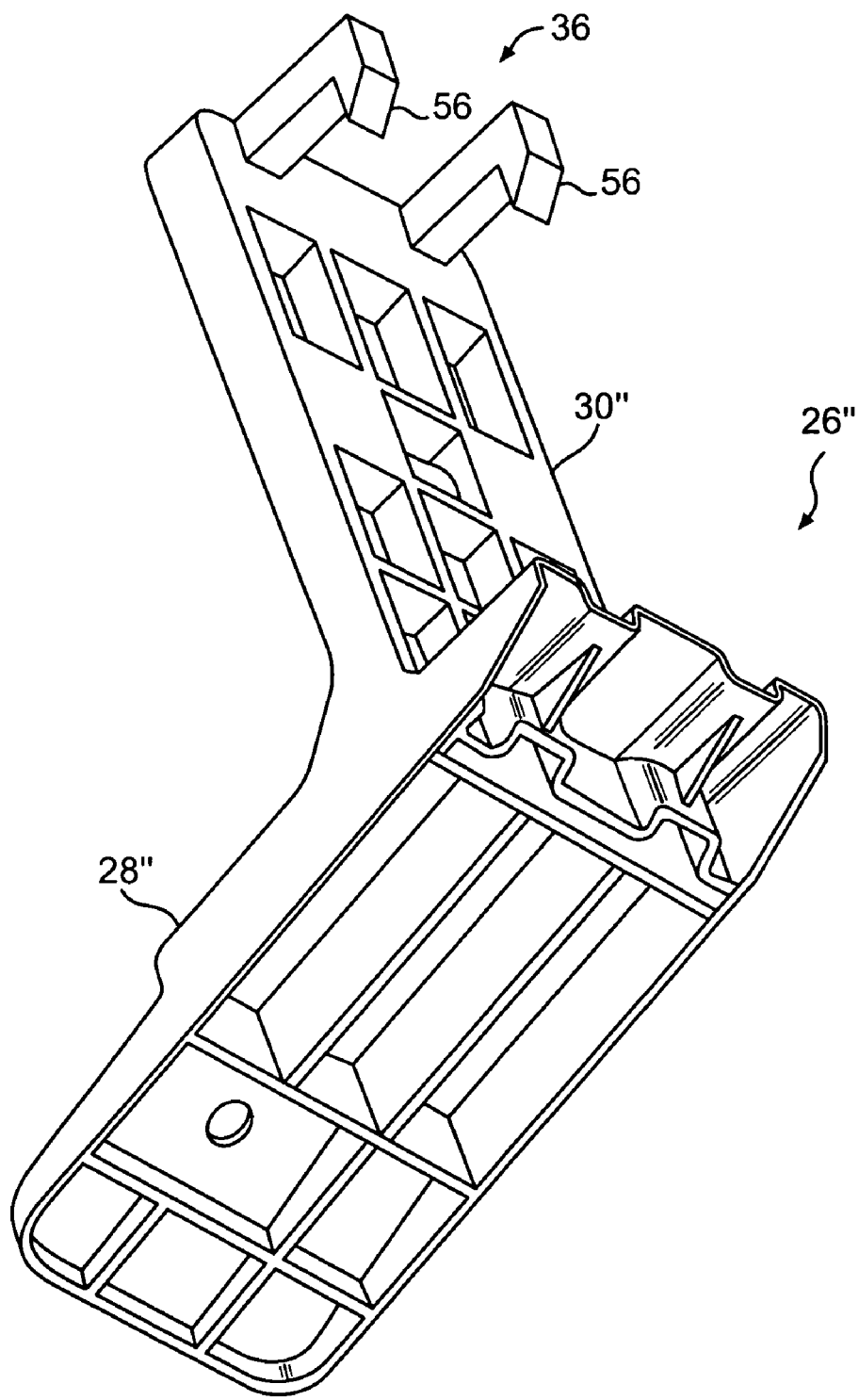
FIG. 11 is an expanded perspective view of yet another radiator mounting bracket designed according to the present invention

Referring to FIG. 11, another embodiment of a heat exchanger bracket 26" is disclosed. The mounting bracket assembly 26" generally includes the features of the bracket described above, however, the upper attachment member 36 include a hook member 56 (two shown) which extends from the heat exchanger bracket portion 30". The hook member 56 preferably extends over the heat exchanger 24 in place of the posts, which pass through the apertures in the upper heat exchanger mount 50U. The hook member 56 is preferably flexible such that the lower heat exchanger mount 50L slip fits into the slot 34 and the heat exchanger is then rotated under the hook members 56 which flex over and onto a top portion of the heat exchanger 24. Notably, an upper heat exchanger mount 50U is not required in this embodiment.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A mounting bracket for attaching a vehicle heat exchanger to a vehicle frame member comprising:
    a non-metallic frame mount bracket portion; and
    a non-metallic heat exchanger bracket portion contiguous with said frame mount bracket portion, said non-metallic heat exchanger bracket portion having a shelf defining a slot generally parallel to said frame mount bracket portion and an upper attachment member extending from said non-metallic heat exchanger bracket portion which is generally transverse to said slot.

2. The mounting bracket as recited in claim 1, wherein said non-metallic heat exchanger bracket portion and said frame mount bracket portion are formed of a glass-filled polypropylene.

3. The mounting bracket as recited in claim 1, wherein said non-metallic heat exchanger bracket portion is generally perpendicular to said non-metallic frame mount bracket portion.

4. The mounting bracket as recited in claim 3, wherein said shelf extends in a cantilever arrangement from said non-metallic heat exchanger bracket portion.

5. The mounting bracket as recited in claim 1, wherein said non-metallic frame mount bracket portion defines an aperture to receive a fastener to mount said non-metallic frame mount bracket portion to a fixed structure.

6. The mounting bracket as recited in claim 5, further comprising a compression limiter mounted about said aperture.

7. The mounting bracket as recited in claim 1, wherein said non-metallic heat exchanger bracket portion includes an open slatted area.

8. The mounting bracket as recited in claim 1, wherein said non-metallic heat exchanger bracket portion and said non-metallic frame mount bracket portion form a generally L-shape.

9. The mounting bracket as recited in claim 1, wherein said non-metallic frame mount bracket portion is generally parallel to said shelf.

10. The mounting bracket as recited in claim 1, wherein said non-metallic frame mount bracket portion forms said shelf.

11. The mounting bracket as recited in claim 1, wherein said upper attachment member includes a heat-stakeable post.

12. A mounting bracket for attaching a vehicle heat exchanger to a vehicle member comprising:
    a non-metallic frame mount bracket portion;

a non-metallic heat exchanger bracket portion contiguous with said frame mount bracket portion;

a shelf extending from said non-metallic heat exchanger bracket portion, said shelf defining a slot generally parallel to said non-metallic frame mount portion; and a heat-stakeable post extending from said non-metallic heat exchanger bracket portion, said post generally parallel to said shelf and transfer to said slot.

13. The mounting bracket as recited in claim 12, wherein said non-metallic heat exchanger bracket portion and said frame mount bracket portion are formed of a glass-filled polypropylene.

14. The mounting bracket as recited in claim 12, further comprising a lower heat exchanger mount engageable with said slot and an upper heat exchanger mount engageable with said post.

15. The mounting bracket as recited in claim 14, wherein said post is heat staked to said upper heat exchanger mount.

16. The mounting bracket as recited in claim 14, wherein said lower heat exchanger mount and said upper heat exchanger mount are formed of a metallic material.

17. A vehicle heat exchanger comprising:

a non-metallic frame mount bracket portion;

a non-metallic heat exchanger bracket portion extending contiguous with said frame mount bracket portion;

a shelf extending from said non-metallic heat exchanger bracket portion, said shelf defining a slot;

a heat-stakeable post extending from non-metallic heat exchanger bracket portion, said post generally parallel to said shelf; and a heat exchanger having a lower heat exchanger mount and an upper heat exchanger mount, said lower heat exchanger mount engageable within said slot and said upper heat exchanger mount defining an aperture to receive said post.

18. The vehicle heat exchanger as recited in claim 17, wherein said heat exchanger is supported upon said shelf.

* * * * *